United States Patent Office 3,801,557
Patented Apr. 2, 1974

---

3,801,557
IN-SITU INITIATION OF VINYL CHLORIDE POLYMERS WITH SULFONYL PEROXIDES
Michael Langsam, Allentown, Pa., assignor to Air Products and Chemicals, Inc., Allentown, Pa.
No Drawing. Filed June 19, 1972, Ser. No. 264,045
Int. Cl. C08f 3/30, 15/06, 15/30
U.S. Cl. 260—87.1               8 Claims

---

ABSTRACT OF THE DISCLOSURE

High quality granular vinyl chloride based polymers are manufactured in the presence of an organic sulfonyl peroxide free-radical catalyst, which is prepared in-situ in the presence of the vinyl monomers. The in-situ reaction may be conducted over a wide pH range using a flexible ratio of reactants without adversely affecting product quality.

---

BACKGROUND OF THE INVENTION

This invention relates to a process for perparing commercially desirable vinyl chloride based polymers, such as vinyl chloride homopolymers (PVC) and copolymers containing vinyl chloride and other comonomers, wherein organic sulfonyl peroxide free-radical catalysts represented by the following formulas are prepared in-situ:

(I)
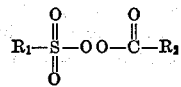

(II)
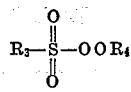

where $R_1$ of the acyl sulfonyl peroxides of Formula I is alkyl, alkenyl, aryl or substituted aryl, $R_2$ is hydrogen or a $C_1$ to $C_4$ alkyl radical, $R_3$(II) is the same as $R_1$ and $R_4$ is hydrogen or alkali metal.

The in-situ reaction may be initiated and conducted in either an acid or alkaline medium with a broad, flexible ratio of organic sulfonyl halide to aqueous soluble peroxide for preparing the catalyst, all without adversely affecting the quality of the resulting polymer.

Polymerization of vinyl based monomers, such as vinyl chloride may be accomplished by means of a free-radical polymerization initiator in either a suspension, emulsion or bulk polymerization system. Polymerization itself is initiated by the generation of free-radicals arising from the decomposition of various organic peroxides, such as benzoyl peroxide, lauroyl peroxide and the like. Organic sulfonyl peroxide type free-radical catalysts, I and II above, as with other organic peroxy catalysts, if not specially handled by storing at sufficiently low temperatures or if not metered into the reactor under carefully controlled conditions can result in an uncontrollable rate of reaction endangering both operators and equipment, as well as adversely affecting the resulting polymers.

The process of manufacturing vinyl chloride polymers by means of a peroxy-type free-radical catalyst prepared in-situ has been demonstrated in U.S. Pats. 3,022,281 and 3,575,945. Each provides for the preparation of a dialkyl peroxydicarbonate type catalyst in an aqueous suspension system containing the monomer, wherein the catalyst upon forming decomposes to supply the free-radicals necessary for the monomers to undergo polymerization.

The process described in 3,022,281 requires all stages of the reaction to be conducted in an alkaline medium above a pH 7. It is further recommended, an alkaline buffering agent be employed to maintain a constant alkaline pH during the entire cycle, since the in-situ reaction between the haloformate and peroxide yields acidic hydrogen halide. This process further provides for a sufficient amount of hydrogen peroxide to react with the haloformate present, which necessitates using at least a stoichiometrically equivalent amount of hydrogen peroxide, amounting to not less than 1 mole of hydrogen peroxide for each 2 moles of haloformate.

Although this earliest in-situ process did provide a solution to problems of special storage and uncontrolled reaction rate by eliminating the use of pre-manufactured peroxy catalysts, other difficulties arose making the process less than satisfactory. It was found that polymers manufactured accordingly were not in the desired granular form, but instead were of a fibrous consistency. Furthermore, it was discovered that other commercially important resins, such as vinyl chloridevinyl acetate copolymers could not be readily prepared in a commercially acceptable quality due to their undergoing alkaline hydrolysis.

In attempting to remedy these apparent shortcomings, U.S. 3,575,945 suggests the use of excess haloformate to insure preparation of the more desirable PVC granules. However, as with the earlier process, the pH of the aqueous phase of the suspension system, at least initially, had to be carefully adjusted and maintained at above 7. In spite of the generally improved product quality, this latter process also lacked the desired flexibility, not just in terms of operable pH range, but also proportional ranges of reactants needed for in-situ preparation of the free-radical initiator.

It has now been discovered that high quality granular vinyl chloride based polymers can be prepared by a flexible process beginning either with an acid or alkaline pH while simultaneously using a wide ratio of reactants. The polymers are prepared by forming an organic sulfonyl peroxide catalyst in-situ having the formula:

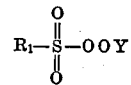

wherein R, is alkyl, alkenyl, aryl or substituted aryl and Y is hydrogen, alkali metal or a

group in which $R_2$ is hydrogen or $C_1$ to $C_4$ alkyl radical. Said free-radical catalyst is formed in the polymerization process from the reaction of an organic sulfonyl halide and a water soluble peroxide, said organic sulfonyl halide having the formula:

wherein R is the same as $R_1$ and X is halogen.

Accordingly, it is a principal object of the present invention to provide a process for manufacturing high quality, granular vinyl chloride based polymers wherein the polymerization initiator is prepared in-situ in a reaction mixture which may be either acid or alkaline.

It is a further object of the present invention to provide a flexible process allowing a wide variation of proportional amounts of reactants for preparing in-situ, organic sulfonyl peroxide free-radical catalysts for polymerizing vinyl chloride based monomers, all without adversely affecting product quality.

A still further object is to provide a process for manufacturing vinyl chloride based copolymers by employing an organic sulfonyl peroxide free-radical catalyst which catalyst itself is prepared in the reaction mixture.

These and other objects, features and advantages of this invention will become apparent to those skilled in the art after a reading of the following more detailed description.

PREFERRED EMBODIMENTS OF THE INVENTION

Broadly, the invention is directed to a process for preparing vinyl chloride based polymers with the aid of an organic sulfonyl peroxide which is inclusive of acyl sulfonyl peroxides (I) and sulfonyl peroxide (II) free-radical catalysts prepared in-situ during polymerization of the monomers. The process is adaptable to polymerization systems having a water phase and a monomer phase in which each of the reactants required for preparing the catalyst is soluble in one of the two mentioned phases.

In carrying out the process the organic sulfonyl peroxide is formed in the presence of the monomer by a water soluble peroxide reacting with an organic sulfonyl halide. The peroxide reactant is soluble in the water phase and the sulfonyl halide is miscible in the monomer phase. Because the catalyst is readily prepared in the presence of either an acid or alkaline aqueous phase, no alkali metal hydroxide, special alkaline buffering agents, bicarbonates, acidifiers, and the like need be employed. The initial pH of the water phase will range generally from about 4 to about 11, and more specifically, from about 5 to about 8. However, most optimally, the pH will be about 6 or 6.5 to 7. In this regard, it has been discovered if polymerization is at least initiated at this optimal pH range, more acceptable yields of polymer result. As a matter of course, as the cycle proceeds, the pH will gradually decrease to about 1.5 to 3 or 4, since acidic hydrogen halide is generated during the in-situ process. In some cases, it may be desirable to employ a buffering agent to avoid excessively low pH's.

The organic sulfonyl peroxide initiator, after being formed in the presence of the monomer, decomposes, thus providing the free-radicals necessary to bring about polymerization of the monomers. The reaction is initiated at temperatures either above or below ordinary ambient temperatures.

As previously indicated, the instant process finds widespread use in polymerization systems containing both water and oil or monomer phases wherein vinyl based monomers are polymerized in the presence of a free-radical catalyst, and more particularly, an organic sulfonyl peroxide free-radical catalyst. However, the method of the present invention is specially applicable to the manufacure of vinyl chloride based polymers, which, for purposes of this invention, denote both homopolymers and copolymers, such as polyvinyl chloride (PVC), polyvinylidene chloride, and copolymers containing vinyl chloride and other comonomers such as vinyl acetate, acrylate and methacrylate esters and the like. The acrylates include, for example, methyl, ethyl, butyl, and 2-ethylhexyl. Usual methacrylates include, for example, methyl, ethyl, butyl, lauryl, and stearyl. Included along therewith, are copolymers of vinyl chloride and various olefins, and particularly, those comprising vinyl chloride and propylene, such as the solid resins disclosed in U.S. Pat. 3,468,858. Copolymers disclosed therein are characterized by having from about 90 to 99% vinyl chloride and a propylene content of 1 to 10%, preferably 2 to 8% by weight, an intrinsic viscosity of 0.5 to 1.5 dl./g. and a melt flow rate of at least 0.1 dg./min.

Although the disclosed processes are particularly adaptable to the preparation of the foregoing vinyl chloride based polymers, other vinyl based homo- and copolymers may also be manufactured accordingly. They include polymers of other vinyl halides, alcohols, esters and ethers, such as vinyl fluoride, vinyl alcohol, vinyl acetal, vinyl butyral, vinyl formal, vinyl laurate, vinyl myristal ether, vinyl lauryl ether and the like.

The sulfonyl peroxides or acyl sulfonyl peroxides generated in the reaction mixture, in-situ, for initiating polymerization of the above-mentioned monomers are prepared by the reaction of a water soluble peroxide with an organic sulfonyl halide. The aqueous soluble peroxide may be hydrogen peroxide, any of the alkali metal peroxides like sodium and potassium or acid peroxides having up to 4 carbon atoms e.g. . . . peracetic acid, performic acid, etc. The requirements in selecting the particular peroxide are not critical, however, they must nevertheless be miscible with the aqueous phase of the polymerization system.

The organic sulfonyl halides may be represented by the formula:

wherein R is alkyl, alkenyl, aryl or substituted aryl and X is a halogen, like fluorine, chlorine, bromine or iodine. Alkyl and alkenyl relate to radicals having from 1 to 10 carbon atoms or more, which may be both branched and straight chained groups, like methyl, ethyl, propyl, isopropyl, n-butyl, t-butyl, isobutyl, pentyl, sec.-pentyl, hexyl, propenyl, allyl and the like. Higher radicals usch as decyl, dodecyl and hexadecyl are also included in this group. Aryl and substituted aryl includes phenyl, tolyl (o, m or p) and halophenyl like chlorine, bromine, or iodine which may also be in the 2, 3 or 4 position.

The following table illustrates but a few of the organic sulfonyl halides falling within the purview of the above formula.

TABLE I

| R: | X |
|---|---|
| $CH_3$— | Cl |
| $n\text{-}C_4H_9$— | Cl |
| $t\text{-}C_4H_9$— | Br |
| $C_2H_5$— | Cl |
| $n\text{-}C_3H_7$— | I |
| $n\text{-}C_3H_7$— | Cl |
| $C_3H_5$— | Br |
| $C_{10}H_{21}$— | Cl |
| $p\text{-}CH_3C_6H_4$— | Cl |
| $4\text{-}BrC_6H_4$— | Cl |

In-situ preparation of a sulfonyl peroxide or acyl sulfonyl peroxide catalyst may be accomplished by incorporating the peroxide reactant into the aqueous phase of the reaction mixture and the particular organic sulfonyl halide into the oil phase of the polymerization system. Organic sulfonyl halides and peroxides may be added in a ratio ranging from about 1:10 to about 10:1 and more preferably from 4:1 to 1:4. Acyl sulfonyl peroxides corresponding to compounds of the type of Formula I are prepared when the foregoing organic sulfonyl halide is reacted in-situ with peroxides like performic acid, peracetic acid, etc. On the other hand, free-radical catalysts, like those of Formula II are typically prepared whenever hydrogen peroxide or sodium or potassium peroxides are employed in the presence of an organic sulfonyl halide. The total organic sulfonyl halide and peroxide in-situ reactants should be used in a range from about 0.001% to 5.0% based on the monomer. Formation of the polymerization catalyst in the presence of the monomer can be initiated over a broad temperature range, usually from about 5° to about 75° C., and more preferably, at from about 40° to about 60° C.

Representative examples of organic sulfonyl peroxide free-radical catalysts prepared in-situ corresponding to the following formula are shown in the table below.

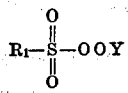

TABLE II

| R₁ | Y |
|---|---|
| n-C₄H₉— | H |
| n-C₄H₉— | —C(O)—CH₃ |
| t-C₄H₉— | —C(O)—H |
| C₂H₅— | H |
| CH₃— | —C(O)—CH₃ |
| C₂H₅— | —C(O)—CH₂—CH₃ |
| 4-ClC₆H₄— | Sodium |
| p-CH₃C₆H₄— | —C(O)—CH₂—CH₂—CH₃ |

In preparing granular resins according to the present invention, protective colloids may be optionally included in the aqueous phase. Any colloidal forming material can be employed which would be consistent with standard practices in suspension polymerization systems. Especially preferred members would include cellulosic compounds like hydroxymethyl or hydroxyethyl cellulose. Various surfactants may also be used, such as Aerosol-OT (di-octyl sodium sulfosuccinate) as well as other non-ionic materials. These agents, when used, are added in an amount from about 0.01 to about 1% by weight.

The following examples illustrate some of the embodiments of this invention. It is to be understood, however, that these are for illustrative purposes only, and do not purport to be wholly definitive as to conditions and scope.

EXAMPLE I

A water bath tumbler was charged with the following.

| | | |
|---|---|---|
| Distilled water | ml | 200.00 |
| Hydroxymethylcellulose | gm | 0.072 |
| Peracetic acid | gm | 0.365 |
| Vinyl chloride | gm | 100.00 |
| n-Butyl sulfonyl chloride | ml | 2.33 |

The hydroxymethylcellulose was first dissolved in the water followed by the peracetic acid, which formed the aqueous phase. The initial pH was 2.70. The vessel was flushed with nitrogen to remove the air. The reactor was then charged with vinyl chloride monomer which had been earlier dispersed with the n-butyl sulfonyl chloride. The vessel was capped and warmed at 50° C. and tumbled for 24 hours. The yield at the end of this period was 12.8 grams and the final pH was 1.9. The PVC was a high grade, granular material.

EXAMPLE II

A reactor was charged with the same ingredients as disclosed in Example I, however, 2 grams of sodium bicarbonate was added to the aqueous phase of the charge. The initial pH was 6.4. After being tumbled for 24 hours at 50° C. the final pH was 1.9. The yield was 91.1 grams of PVC.

EXAMPLE III

A charge was prepared in accordance with the formulation of Example I. However, added thereto was 10.0 grams of sodium bicarbonate according to the method of Example II. The initial pH was 7.5 and the final pH was 8.7 after being warmed for 24 hours at 50° C. The yield was 51.5 grams of PVC.

EXAMPLE IV

| | | |
|---|---|---|
| Water | ml | 200.00 |
| Na₃PO₄ | gm | 0.30 |
| Na₂HPO₄ | gm | 0.30 |
| Methocel HG65 (hydroxymethylcellulose) | gm | 0.16 |
| Aerosol OT | gm | 0.018 |
| Peracetic acid | gm | 0.367 |
| Vinyl chloride | gm | 100.0 |
| n-Butyl sulfonyl chloride | m. moles | 4.72 |

The hydroxymethylcellulose and Aerosol OT were dissolved in the water along with the phosphate buffer. The peracetic acid was included to provide the aqueous phase with a pH of 6.5. The n-butyl sulfonyl chloride was dispersed in the vinyl chloride which was then added to the aqueous solution. The mixture was stirred and heated to 50° C. After a period of four hours a yield of 25.2 grams of PVC was obtained. The final pH was 1.4.

While the invention has been described in conjunction with specific examples thereof, this is illustrative only. Accordingly, many alternatives, modifications and variations will be apparent to those skilled in the art in light of the foregoing description and it is therefore intended to embrace all such alternatives, modifications and variations as to fall within the spirit and broad scope of the appended claims.

I claim:

1. A process for preparing vinyl chloride based polymers in an aqueous system which comprises forming an organic sulfonyl peroxide free-radical catalyst in-situ during polymerization, said catalyst having the formula:

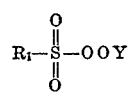

wherein R₁ is alkyl, alkenyl, aryl or substituted aryl and Y is hydrogen, alkali metal or a

group in which R₂ is hydrogen or C₁ to C₄ alkyl radical, the catalyst being prepared from a water soluble peroxide and an organic sulfonyl halide in a ratio ranging from about 1:10 to about 10:1, the sulfonyl halide having the formula:

wherein R is the same as R₁ and X is halogen.

2. The process of claim 1 wherein the vinyl chloride based polymer is polyvinyl chloride.

3. The process of claim 1 wherein the vinyl chloride based polymer is a vinyl chloride-vinyl acetate copolymer.

4. The process of claim 1 wherein the vinyl chloride based polymer is a vinyl chloride-propylene copolymer.

5. The process of claim 1 wherein the organic sulfonyl halide is n-butyl sulfonyl chloride.

6. The process of claim 1 wherein the ratio of organic sulfonyl halide to water soluble peroxide is from about 4:1 to about 1:4.

7. The process of claim 1 wherein the water soluble peroxide is hydrogen peroxide, sodium peroxide, potassium peroxide, peracetic acid or performic acid.

8. The process of claim 1 wherein the initial pH of the reaction mixture is from about 6.0 to 7.0.

References Cited

UNITED STATES PATENTS

| | | | |
|---|---|---|---|
| 3,340,243 | 9/1967 | Beer et al. | 260—92.8 W |
| 3,586,722 | 6/1971 | Sanchez et al. | 260—92.8 R |
| 3,575,945 | 4/1971 | Cantoni et al. | 260—92.8 W |

HARRY WONG, JR., Primary Examiner

U.S. Cl. X.R.

260—67 UA, 86.3, 87.5 C, 89.1, 91.1 M, 92.1 R, 92.8 W